US010015289B2

(12) United States Patent
Bosch et al.

(10) Patent No.: US 10,015,289 B2
(45) Date of Patent: Jul. 3, 2018

(54) SYSTEM AND METHOD FOR DISTRIBUTION OF RADIO CHANNEL STATE AND BASE STATION CONGESTION STATE IN A NETWORK ENVIRONMENT

(71) Applicant: CISCO TECHNOLOGY, INC., San Jose, CA (US)

(72) Inventors: Hendrikus G. P. Bosch, Aalsmeer (NL); Louis Gwyn Samuel, Swindon (GB); Alessandro Duminuco, Milan (IT); Kevin D. Shatzkamer, Hingham, MA (US); Oliver James Bull, Bristol (GB); Ziv Nuss, Tsur Yigal (IL)

(73) Assignee: Cisco Technology, Inc., San Jose, CA (US)

( * ) Notice: Subject to any disclaimer, the term of this patent is extended or adjusted under 35 U.S.C. 154(b) by 197 days.

(21) Appl. No.: 14/457,995

(22) Filed: Aug. 12, 2014

(65) Prior Publication Data

US 2016/0050580 A1 Feb. 18, 2016

(51) Int. Cl.
*H04L 12/801* (2013.01)
*H04L 29/06* (2006.01)
(Continued)

(52) U.S. Cl.
CPC ............ *H04L 69/22* (2013.01); *H04L 1/0026* (2013.01); *H04L 12/6418* (2013.01);
(Continued)

(58) Field of Classification Search
CPC ....... H04L 1/0026; H04L 12/56; H04L 12/66; H04L 47/115; H04L 12/6418; H04L 47/12; H04L 69/22; H04W 24/10
See application file for complete search history.

(56) References Cited

U.S. PATENT DOCUMENTS

| 7,466,652 B2 | 12/2008 | Lau et al. |
| 2005/0047340 A1* | 3/2005 | Babiarz ............ H04L 29/06027 370/231 |

(Continued)

FOREIGN PATENT DOCUMENTS

| CN | 102523604 A | 6/2012 |
| CN | 105376795 | 3/2016 |

(Continued)

OTHER PUBLICATIONS

"3PP TR23.705 VO.11.0 (May 2014) Technical Report: $3^{rd}$ Generation Partnership Project; Technical Specification Group Services and System Aspects; Study on System Enhancements for User Plane Congestion Management (Release 13)," $3^{rd}$ Generation Partnership Project (3GPP), a Global Initiative, May 2014, 64 pages.

(Continued)

*Primary Examiner* — Noel Beharry
*Assistant Examiner* — Richard Schnell
(74) *Attorney, Agent, or Firm* — Patterson + Sheridan, LLP

(57) ABSTRACT

An example method is provided in one example embodiment and can include obtaining, within a radio access network, a channel state for a data channel associated with a mobile terminal; including the channel state in a differentiated services (diffserv) marking within an Internet Protocol (IP) header of at least one IP packet associated with the mobile terminal; and transmitting the at least one IP packet including the IP header having the diffserv marking toward a packet data network.

20 Claims, 8 Drawing Sheets

(51) Int. Cl.
*H04L 1/00* (2006.01)
*H04L 12/64* (2006.01)
(52) U.S. Cl.
CPC ............. *H04L 47/115* (2013.01); *H04L 47/12* (2013.01); *H04L 47/14* (2013.01)

(56) References Cited

U.S. PATENT DOCUMENTS

| | | | |
|---|---|---|---|
| 2007/0097926 A1 | 5/2007 | Liu et al. | |
| 2007/0217406 A1* | 9/2007 | Riedel | H04L 12/5695 370/389 |
| 2008/0056273 A1* | 3/2008 | Pelletier | H04L 69/04 370/395.21 |
| 2008/0248807 A1* | 10/2008 | Kim | H04W 28/24 455/453 |
| 2011/0116460 A1 | 5/2011 | Kovvali et al. | |
| 2012/0190355 A1* | 7/2012 | Van Rooyen | H04H 20/24 455/422.1 |
| 2013/0163463 A1* | 6/2013 | Grayson | H04L 43/0876 370/253 |
| 2014/0321283 A1* | 10/2014 | Thyni | H04L 47/14 370/235 |
| 2015/0296359 A1* | 10/2015 | Edge | H04W 4/22 455/404.2 |

FOREIGN PATENT DOCUMENTS

| | | |
|---|---|---|
| EP | 2985939 | 2/2016 |
| WO | WO2011/025438 | 3/2011 |
| WO | WO2011/057292 | 5/2011 |
| WO | 2013/089603 | 6/2013 |

OTHER PUBLICATIONS

"ETSI TS 129 272 V11.9.0 (Dec. 2013) Technical Specification: Universal Mobile Telecommunications System (UMTS); LTE; Evolved Packet System (EPS); Mobility Management Entity (MME) and Serving GPRS Support Node (SGSN) Related Interfaces Based on Diameter Protocol (3GPP TS 29.272 Version 11.9.0 Release 11)," © European Telecommunications Standards Institute 2013; ETSI, Dec. 2013, 125 pages.
"ETSI TS 129 274 V9.5.0 (Jan. 2011) Technical Specification: Universal Mobile Telecommunications System (UMTS); LTE; 3GPP Evolved Packet System (EPS); Evolved General Packet Radio Service (GPRS) Tunnelling Protocol for Control Plane (GTPv2-C); Stage 3 (3GPP TS 29.274 Version 9.5.0 Release 9)," © European Telecommunications Standards Institute 2011; ETSI, Jan. 2011, 174 pages.
ETSI TS 123 002 V11.6.0 (Jun. 2013) Technical Specification: Digital Cellular Telecommunications System (Phase 2+); Universal Mobile Telecommunications System (UMTS); LTE; Network Architecture (3GPP TS 23.002 Version 11.6.0 Release 11); © European Telecommunications Standards Institute 2013; ETSI, Jun. 2013, 107 pages.
Information Sciences Institute, University of Southern California, "Internet Protocol DARPA Internet Program Protocol Specification," RFC 791, Sep. 1981; 54 pages.
Ramakrishnan, K., et al., "The Additional of Explicit Congestion Notification (ECN) to IP," Network Working Group RFC 3168, Sep. 2001; 63 pages.
EPO Dec. 14, 2015 Search Report and Written Opinion from European Application No. EP15180291.5; 6 pages.
Chinese Office Action from CN201510490925 dated Mar. 20, 2018.

\* cited by examiner

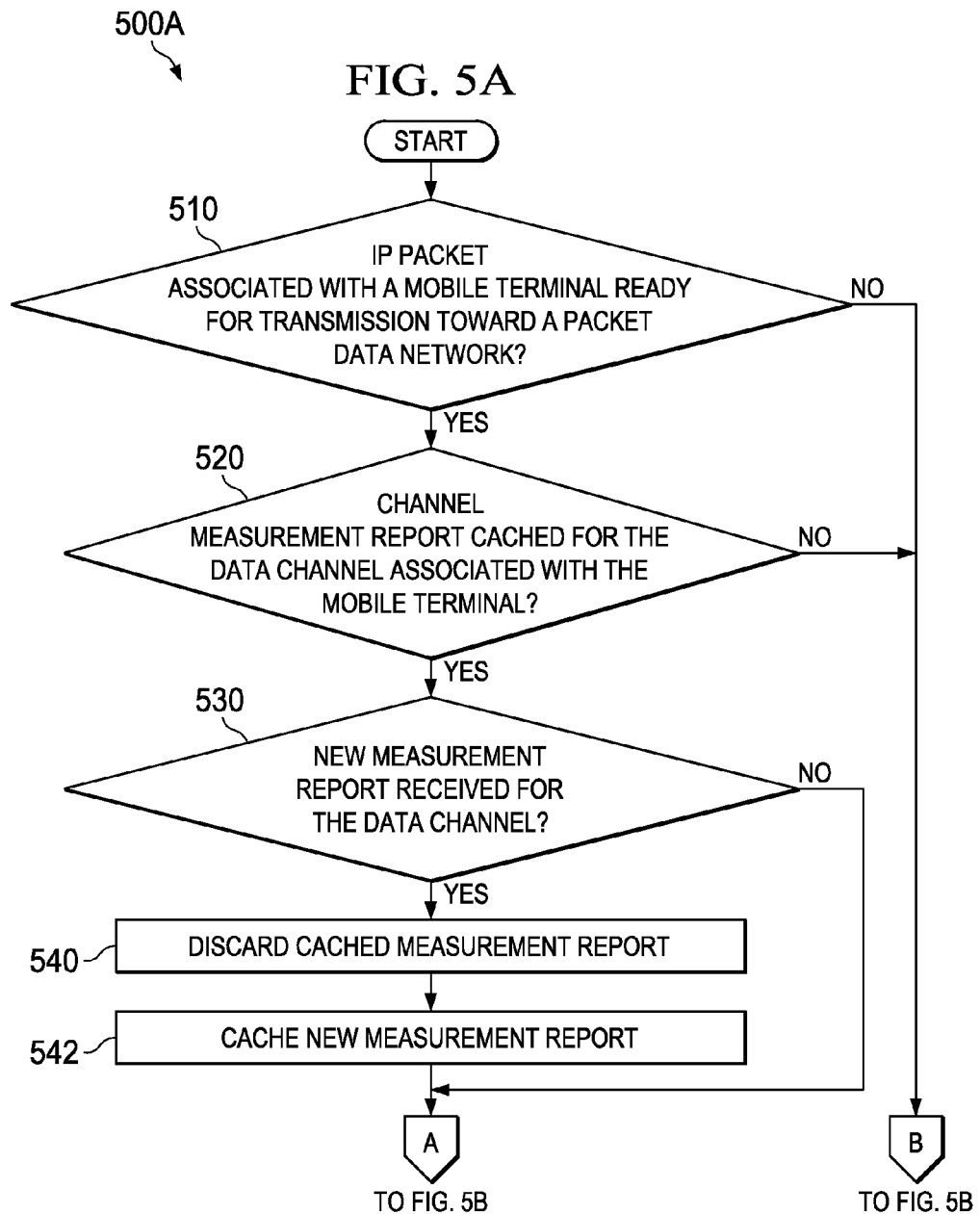

SYSTEM AND METHOD FOR
DISTRIBUTION OF RADIO CHANNEL
STATE AND BASE STATION CONGESTION
STATE IN A NETWORK ENVIRONMENT

TECHNICAL FIELD

This disclosure relates in general to the field of communications and, more particularly, to a system and method for distribution of radio channel state and base station congestion state in a network environment.

BACKGROUND

Networking architectures have grown increasingly complex in communications environments, particularly mobile wireless environments. Mobile communication networks have grown substantially in subscriber base as end users become increasingly connected to mobile wireless environments. As the number of mobile subscribers increases, efficient management of communication resources becomes more critical. In some instances, management of resources depends on service providers understanding congestion within a radio access network (RAN) for mobile communication networks. However, RAN congestion information is often managed within the RAN itself; thus, there are significant challenges in communicating congestion related information for the RAN to service providers, other elements or other portions of mobile communication networks in order to facilitate the efficient management of communication resources.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 5A-5B are simplified flow diagrams illustrating example operations associated with the distribution of radio channel state and base station congestion state in one embodiment of the communication system.

DETAILED DESCRIPTION OF EXAMPLE
EMBODIMENTS

Overview

A method is provided in one example embodiment and may include obtaining, within a radio access network, a channel state for a data channel associated with a mobile terminal; including the channel state in a differentiated services (diffserv) marking within an Internet Protocol (IP) header of at least one IP packet associated with the mobile terminal; and transmitting the at least one IP packet including the IP header having the diffserv marking toward a packet data network. In one instance, the diffserv marking can include at least one of: one or more bits indicating whether the channel state is for an uplink data channel or downlink data channel associated with the mobile terminal; one or more bits indicating the channel state of the data channel associated with the mobile terminal; and one or more bits indicating at least one of: presence of the channel state for the data channel associated with the mobile terminal being included in the IP header; and presence of the channel state for the data channel associated with the mobile terminal being included in the IP header and that a base station serving the mobile terminal is experiencing congestion.

In some cases, obtaining the channel state can include receiving, by a data plane measurement interface, a first measurement report indicating the channel state of the data channel associated with the mobile terminal and including the channel state in the diffserv marking can include, at least in part, setting one or more bits corresponding to the first measurement report in the diffserv marking. In some instances the data plane measurement interface can be contained within a radio network controller in the radio access network. In some instances, the data plane measurement interface can be contained within an eNodeB in the radio access network. In yet other instances, the data plane measurement interface can be contained within at least one of: a Home Node B (HNB) in the radio access network; and a Home eNodeB (HeNB) in the radio access network.

In still other cases, the method can include caching the first measurement report in at least one memory element; determining whether a subsequent measurement report associated with the mobile terminal has been received; discarding the first measurement report if a subsequent measure has been received; and caching the subsequent measurement report in the at least one memory element. In some instances, the subsequent measurement report can include at least one of: an updated channel state for the data channel as represented by the first measurement report associated with the mobile terminal; and a new channel state for another data channel associated with the mobile terminal.

Example Embodiments

Figure 1:
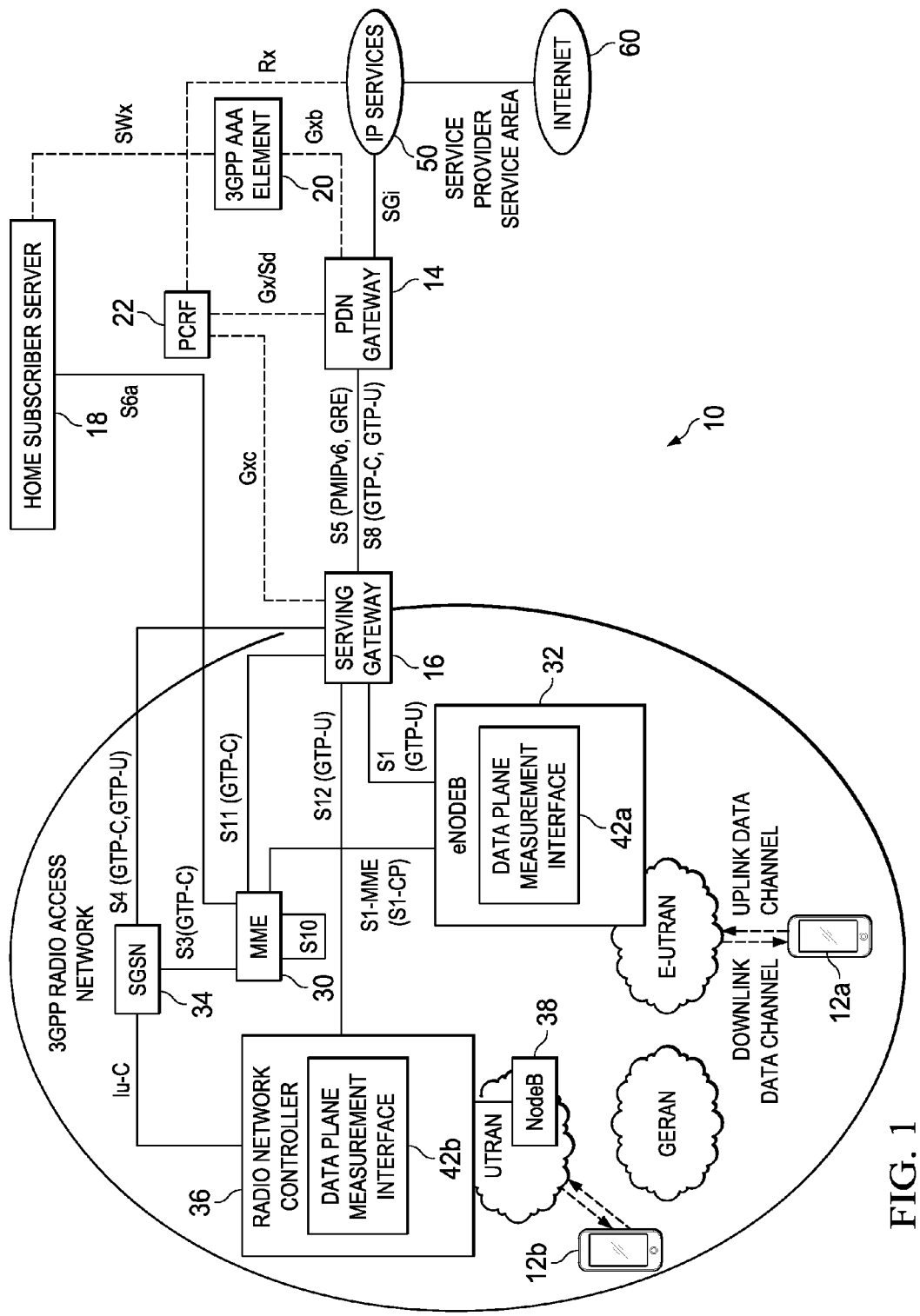
FIG. 1 is a simplified block diagram illustrating a communication system to facilitate distribution of radio channel state and base station congestion state according to one embodiment of the present disclosure.

Turning to FIG. 1, FIG. 1 is a simplified block diagram illustrating a communication system 10 to facilitate distribution of radio channel state and base station congestion state according to one embodiment of the present disclosure. This particular configuration may be tied to the 3rd Generation Partnership Project (3GPP) Evolved Packet System (EPS) architecture, also sometimes referred to as the Long-term Evolution (LTE) EPS architecture. Alternatively, the depicted architecture may be applicable to other environments equally.

The example architecture of FIG. 1 may include multiple end users or subscribers operating mobile terminals 12*a*-12*b* and a packet data network (PDN) gateway (PGW) 14, which has a logical connection to a serving gateway (SGW) 16. Also provided is a home subscriber server (HSS) 18 and a 3GPP Authentication, Authorization and Accounting (AAA) element 20. SGW 16 may have a logical connection to an eNode B (eNodeB) 32 and a Mobility Management Entity (MME) 30. Both SGW 16 and PGW 14 can interface with a Policy and Charging Rules Function (PCRF) 22. PGW 14 may further interface with a service provider service area 50, which may include one or more Internet Protocol (IP) services. Service provider service area 50 may interface with Internet 60. As shown in FIG. 1, eNodeB 32 may further include a data plane measurement interface 42a. As discussed herein in this Specification, the terms 'end user', 'user' and 'subscriber' are interchangeable.

Communication system 10 may further include a serving general packet radio service (GPRS) support node (SGSN) 34, which may provide access for legacy universal mobile telecommunications systems (UMTS) network devices. SGSN 34 may interface with MME 30 and a radio network controller (RNC) 36, which may interface with a Node B (NodeB) 38. RNC 36 may further interface with SGW 16 and may include a data plane measurement interface 42b. Additionally, a Global System for Mobile Communications (GSM) Enhanced Data rates for GSM Evolution) EDGE Radio Access Network (GERAN) can communicate through the SGSN 34 to the SGW 16 and/or the PGW 14. In various embodiments, PGW 14 can include a gateway GPRS support node (GGSN) to support communication with legacy systems.

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. For example, communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs.

In more general terms, 3GPP defines the Evolved Packet System (EPS) as specified in Technical Specification (TS) 23.002, TS 29.272, TS 29.274, etc. The EPS generally consists of mobile terminal (also referred to as 'user equipment' (LIE)) access networks and an Evolved Packet Core (EPC). Access networks be 3GPP radio access networks (RANs) (as shown in FIG. 1) including legacy access networks such as GERAN, UMTS Terrestrial Radio Access Network (UTRAN), also referred to as 3G, or LTE/LTE-Advanced (LTE-A) radio access networks such as Evolved UTRAN (E-UTRAN), also referred to as 4G/LTE/LTE-A, code division multiplex access (CDMA), Wideband CDMA (WCDMA) and/or CDMA2000, or they may be non-3GPP IP access networks (not shown) such as digital subscriber line (DSL), Cable, WiMAX, WiFi, or the Internet. As referred to herein in this Specification, the 'evolved packet core' may be referred to interchangeably as a 'packet core' or a 'mobile packet core'.

Also provided in the architecture of FIG. 1 is a series of interfaces, which can offer mobility, policy control, AAA functions and/or charging activities (offline and online) for various network elements. For example, interfaces can be used to exchange point of attachment, location, and/or access data for one or more end users, for example, users operating mobile terminals 12a-12b. Resource, accounting, location, access network information, network address translation (NAT) control, etc. can be exchanged using a remote authentication dial in user service (RADIUS) protocol or any other suitable protocol where appropriate. Other protocols that can be used in communication system 10 can include DIAMETER-based protocols, a service gateway interface (SGi), a terminal access controller access-control system (TACACS), TACACS+, Proxy Mobile IP version 6 (PMIPv6), General Packet Radio Service (GPRS) Tunneling Protocol (GTP), Generic Route Encapsulation (GRE), etc. In various embodiments, GTP can be implemented for control plane communications (GTP-C) and/or user data plane communications (GTP-U).

As shown in FIG. 1, a DIAMETER-based Rx interface may be maintained between service provider service area 50 and PCRF 22 for communicating subscriber information between IP services provided by the service provider and PCRF 22. In various embodiments, IP services can include IP multimedia subsystem (IMS) services, which can be provided to subscribers. PCRF 22 may provision policy charging and control (PCC) rules for PGW 14 using a DIAMETER-based Gx/Sd interface and PGW 14 may communicate subscriber information to PCRF 22 over the Gx/Sd interface. Communication system 10 may be configured with additional DIAMETER-based interfaces to manage policy and control between various elements of the system.

Various additional signaling/communication interfaces for communication system 10 may include S6a between HSS 18 and MME 30; S6b between AAA element 20 and PGW 14, S3 (GTP-C) between SGSN 34 and MME 30; S4 (GTP-C, GTP-U) between SGSN 34 and SGW 16; S12 (GTP-U) between RNC 36 and SGW 16; S1-MME (S1-CP) between eNodeB 32 and MME 30 (for control plane signaling); and 51 (GTP-U) between eNodeB 32 and SGW 16. Other signaling/communication interfaces are illustrated between various components of communication system 10 according to 3GPP standards, which are not discussed in further detail for purposes of brevity.

For the purposes of illustrating the techniques of communication system 10, it is important to understand radio channel and base station congestion state information that be used in communication system 10 as shown in FIG. 1. The following contextual information may be viewed as a basis from which the present disclosure may be properly explained. Such information is offered earnestly and for purposes explanation only and, accordingly, should not be construed in a way to limit the broad applications for the present disclosure and its potential applications.

In an EPS architecture, RANs can consist of eNodeBs (e.g., eNodeB 32), which can provide macro cellular coverage for 4G/LTE/LTE-A architecture, and/or NodeBs (e.g., NodeB 38) and RNCs (e.g., RNC 36), which can provide macro cellular coverage for 3G architecture. Typically, eNodeBs are connected directly to an EPC, as well as to other eNodeBs, which can be deployed in the system. Connections with adjacent eNodeBs may allow calls to be routed more directly. Generally, eNodeBs can provide for selecting an MME for UE, managing radio resources, and making handover decisions for mobile terminals. NodeBs (e.g., NodeB 38) may provide a communications interface between a given mobile terminal (e.g., mobile terminal 12b) and RNCs (e.g., RNC 36). In various embodiments, a NodeB can include a base transceiver station and a base station controller (e.g., RNC 36) in a common network element. As referred to herein in this Specification, the term 'base station' may generally be inclusive of an eNodeB and/or a NodeB. It should be noted that the RAN of communication system 10 can also include a collaborative RAN (CRAN), sometimes referred to as a cloud RAN, which can include one or radio units (e.g. eNodeBs, NodeBs, etc.) coupled to one or more baseband or digital units, which may be distributed throughout a cloud, to interface with the packet core. Essentially, a CRAN can provide 3G/4G/LTE/LTE-A functionality using a cloud-based architecture.

Additionally, RANs can consist of Home NodeBs (HNBs) and/or Home eNodeBs (HeNBs) to provide small cell access network coverage. HNBs can provide for 3G small cell network coverage while HeNBs can provide for 4G/LTE/LTE-A small cell network coverage. In many network architectures, HNBs and/or HeNBs can be deployed as autonomous units to improve reception in areas with poor coverage, or within buildings where coverage is reduced by the structure itself. Essentially, HNBs/HeNBs are fully featured base stations that can provide proximate coverage in a business (e.g., enterprise) and/or residential environment. Typically, HNBs/HeNBs operate at lower radio power levels as compared to macro RANs that include NodeBs, eNodeBs, etc. HNBs/HeNBs can be connected using a standard broadband digital subscriber line (DSL), Internet, service network and/or cable service into a service provider's core network via an HNB gateway (HNB-GW) and/or HeNB gateway (HeNB-GW). For deployments including both HNBs and HeNBs, the gateway functionality can be provided in a combined HNB/HeNB-GW. Calls can be made and received, where the signals are sent (potentially encrypted) from an HNB and/or HeNB via the broadband service network to one of the service provider's main switching centers. HeNBs can be provisioned to readily handle 8, 16, 32, etc. concurrent calls. Thus, an HNB and/or HeNB generally operates as a mini tower for a proximate user.

Even with advances of LTE and LTE-A, the main bottleneck of any cellular system remains the cellular wireless link itself between a mobile terminal and a base station. As referred to herein in this Specification, the term 'cellular wireless link' may be used interchangeably with 'radio link'. Since this link is potentially shared with many other subscribers and users, oversubscription of the radio link and congestion of the base station managing the link is not uncommon and are likely a primary reason for transmission delays. Even with relatively few subscribers connected to a particular base station, congestion can still occur due to a high percentage of subscribers residing at edge-of-cell, in less-efficient modulation schemes. One method to reduce contention on the bottleneck of the link is to reduce its use; for example, if a content provider is aware of poor channel conditions of a mobile terminal, the content provider may opt to send a lower quality image or video stream that is better suited and aligned with the mobile terminal's poor channel conditions.

Currently, content providers can infer poor network conditions by monitoring buffer utilization on subscriber devices (e.g., mobile terminals). Protocols such as Adaptive Bit Rate (ABR) video do this individually for each stream. However, a content provider today cannot correlate the subscriber to specific network conditions, or that traffic destined to one subscriber on a shared radio link may impact another subscriber's traffic. The result of this is that protocols like ABR are constantly adapting; e.g., as one subscriber's effective bit rate is decreased, another subscriber's effective bit rate is increased. It should be noted that although ABR can reach a steady state for each subscriber, this steady state may be less than ideal, for example, either consuming too much capacity to deliver individual experience, or sacrificing too much experience to preserve capacity. Thus, the bottleneck of the link is never freed from contention.

Unfortunately, radio channel conditions for cellular links in today's (3GPP) systems are kept and managed by the RAN. Radio-channel conditions are often measured directly at the analog/digital boundary of a cellular link and are expressed as a signal-to-noise ratio (SNR) of the link. When a mobile terminal measures channel conditions it does so to inform the RAN of the mobile terminal's ability to receive information from neighboring cells and to measure channel conditions for the operational efficiency of the cell serving the mobile terminal. A base station measures the channel conditions of the mobile node's uplink for power control purposes. When a RAN receives mobile channel measurements from a mobile terminal, it can decide to instruct the mobile terminal to perform a handover to another cell. However, no open interfaces exist to express the radio channel and/or base station congestion state to functions outside a mobile communication system's RAN, where information related to channel conditions may be useful. Conditions within a RAN can change rapidly and by providing channel condition information outside the RAN, end-systems can respond by altering the content provided to a user. For example, indoor, non-mobile and/or pedestrian users can have varying channel conditions within a single cell, which can mean that providing end-to-end service adjustments for these varying channel conditions could be useful to improve services provided to a user. In another example, such as a highly mobile user (in a car, for example), knowledge of varying channel conditions could be used to add contingencies to a service provided to the user.

One possible solution has been proposed via 3GPP User Plane Congestion (UPCON) management as described in 3GPP Technical Report (TR) 23.705. 3GPP UPCON management describes a method of providing RAN user-plane congestion awareness information via RAN congestion information (RCI), which indicates RAN congestion information to the mobile core network. This information is carried inside the GTP-U uplink packets in existing control-plane (C-Plane) signaling mechanisms (e.g., S1-MME, S11, S5/S8) and allows the core network to either notify the PCRF (via Gx event reporting) or other systems (Rx, Sd) of congestion. The RCI is intended to hold Congestion Level, user ID, EPS Bearer ID, direction of congestion detected (Uplink/Downlink), user location (Cell ID). Other possible solutions for 3GPP UPCON involve analyzing early congestion notification (ECN) bits.

None of these solutions, however, provide a mechanism for the ability to transfer congestion information from the packet core to services outside the RAN (e.g., third-party services, IP services, combinations thereof or the like) except potentially though a PCRF application programming interface (API) such as Rx. However, per-terminal and/or per-flow API-based methods do not scale well for increased subscriber usage, do not address NAT controls and make it difficult to correlate congestion information with time. Correlation of channel state to Internet flow (e.g., Internet IP@) and to external flow (e.g., external IP@, post-NAT) is very difficult. For both content servers and internal systems to agree on a flow, typically involves tremendous state information to be stored on both sides of the flow as well as the extraction of NAT bindings from intermediate nodes. In addition, for short-lived flows, an out-of-band API may not be capable of transferring information, receiving responses based on the information and enforcing policies before a flow completes.

In accordance with one embodiment, communication system 10 can overcome the aforementioned shortcomings (and others) through a solution that provides a mechanism to carry radio channel and base station congestion state in differentiated services (diffserv) markings of IP packet headers. RFC 791 defined eight type-of-service (TOS) bits, which were later redefined by RFC 3168 into diffserv markings. As referred to herein in this Specification, the term 'diffserv markings' may be used interchangeably with 'diffserv marking bits'.

In accordance with one embodiment, communication system 10 may use these bits to carry downlink channel state, uplink channel state and/or base station congestion state from the RAN for communication system 10 within uplink IP traffic from the RAN to a content provider and/or a mobile service provider's service area. In one or more embodiments, a content provider and/or services hosted in a mobile service provider's service area can use the channel state and/or base station congestion information (when present) to alter their services/behavior given the channel congestion state. In one or more embodiments, uplink IP traffic from a RAN can be analyzed by radio analytics tools for cellular network optimizations. In effect, these tools can learn of actual channel state without needing to gather and analyze vendor-specific operations, administration and maintenance (OA&M) traces.

The diffserv markings in an IP header may be an eight (8) bit long field, of which two (2) bits can be defined for ECN with the remaining six (6) bits to be used to encode a diffserv marking. In accordance with one embodiment, the solution provided by communication system 10 may prescribe only when the ECN bits indicate ECN support and/or ECN detected (e.g., bit field '01', '10' and '11', respectively) does the remaining part of an 8-bit diffserv marking carry channel state associated with a mobile terminal. The remaining 6 bits can be defined to include a bit indicating whether the encoded channel state is for uplink or downlink traffic (e.g., 0 or 1, respectively), while the other five (5) bits can be used to define the actual channel state according to a predetermined encoding scheme (e.g., '00000' binary or 0 decimal could represent a bad channel, '11111' binary or 31 decimal could represent a good channel, variations in channel state between good or bad, etc.).

Other bit lengths and/or encoding schemes can be envisioned for the solution provided by communication system 10. In various embodiments, indication uplink or downlink channel may not be indicated and channel state for may be represented in 6 bits. In yet other embodiments, indication of uplink or downlink channel may be indicated in 2 bits, while channel state may be represented in four (4) bits. In yet other embodiments, other RAN information (congestion related or otherwise) could be multiplexed or included in the diffserv markings. Thus, it should be understood that the solution provided by communication system 10 can cover any combination of bit lengths and/or encoding schemes for diffserv markings.

Channel state for a channel associated with a mobile terminal can be obtained in a twofold manner. For uplink data channels, radio-control equipment embedded within or operating in concert with a base station can measure SNR for uplink channels. In various embodiments, these SNR measurements can be mapped to uplink measurement reports for individual mobile terminal bearers for the mobile terminal into an uplink measurement report that may be encoded into a range of 0-31 decimal. For downlink data channels, a given mobile terminal (e.g., mobile terminal 12a) can measure radio channel conditions and can signal these measurements via a downlink measurement report to the RAN using a control message. A RAN's radio resource (RR) function may capture the measurement message, may encode channel conditions for the downlink channel in a manner similar to that as described for uplink data channels.

Thus, channel state may refer to a radio interface measurement of a given uplink or downlink channel. Radio interface measurements can include SNR for LTE, signal-to-interference (SIR) for Wideband CDMA (WCDMA), or any other eNodeB/NodeB and/or HeNB/HNB air interface measurement. As used herein in this Specification, the term 'channel' may be used interchangeably with 'data channel' and 'radio data channel'. Additionally, as referred to herein, the term 'measurement report' can be used to refer to measurements received for uplink data channels and/or for downlink data channels.

Both uplink and downlink measurement reports may be transmitted inside the RAN (e.g., base station) to an interface in an IP protocol layer responsible for re-constructing uplink IP packets that may be destined to IP services in service provider service area 50 and/or Internet 60. In LTE, this function can be performed by a packet data convergence protocol (PDCP) layer in eNodeB 32, such as data plane measurement interface 42a. In UMTS, this function can be performed by a PDCP layer in RNC 36 such as data plane measurement interface 42b. In other standards, such as Evolution-Data Optimization (EvDO), equivalent layers can be utilized in, for example, an RNC and/or packet data service node (PDSN). In other architectures, such as CRAN or any other centralized/cloud-based architecture, a data plane measurement interface or equivalent layers can be performed by any device or element that may include a PDCP layer or may perform data plane measurements.

During operation, when a given data plane measurement interface (e.g., data plane measurement interface 42a) receives a normalized measurement report for a channel state (e.g., uplink or downlink) of a given mobile terminal (e.g., mobile terminal 12a), it can cache the measurement report for inclusion into a first uplink IP packet of any bearer for mobile terminal 12a. By normalized, it is meant that the data plane measurement interface may map a measurement report (e.g., uplink or downlink) or any other radio interface measurement that may be available and normalize the measurement across the number of bits available for representing the measurement for a diffserv marking. For example, the measurement can be mapped into 4 bits, 5 bits, 6 bits or any other number of bits that may be used to represent the measurement in the diffserv marking. While the range, granularity and/or units of uplink and/or downlink radio interface measurements may not directly map to a given number of bits available (e.g., 4 bits, 5 bits, 6 bits, etc., as determined by a service provider), the linearity of the mapping should be made relative for received radio interface measurements. For example, for a range of 0 (bad) to 31 (good), the received measurement reports (e.g., uplink or downlink) may be mapped into this range and normalized across different inputs (e.g., radio interfaces), if applicable.

Upon determining, at least in part, that an uplink packet is ready for transmission towards the packet core and that a measurement report (either uplink or downlink) is cached for mobile terminal 12a, data plane measurement interface 42a may embed the measurement report for the corresponding data channel in the diffserv markings of an IP packet header for the outgoing IP packet. The measurement report may be embedded in the diffserv markings by setting bits in the diffserv marking within the IP header corresponding to the measurement report. In various embodiments, data plane measurement interface 42a may additionally determine if the measurement report is to be included in the diffserv markings in multiple outgoing IP packets or only a single outgoing IP packet (e.g., a 'one-shot' reporting of channel state) associated with mobile terminal 12a or with particular mobile terminal bearer for mobile terminal 12a.

In various embodiments, channel state (e.g., a measurement report) for a given mobile terminal can be conditionally included in diffserv markings for IP packets associated with the mobile terminal either as a 'one-shot' indication of channel state (e.g., included in the header of a single IP packet for the mobile terminal or a particular bearer of the mobile terminal) or as continuous indication of channel state (e.g., included in the header of multiple IP packets for the mobile terminal or a particular bearer of the mobile terminal). In various embodiments, if a report is included in an IP packet header, the ECN bits in the header can be set to '01' or '10' to indicate a measurement report is included in the IP header or can be set to '11' to indicate that a base station serving the mobile terminal is experiencing congestion as well to indicate. Additionally, the uplink or downlink message bit can be set in accordance with one embodiment.

In various embodiments, as a packet travels towards the Internet 60, any service entity and/or network element hosted in the path towards a correspondent node (e.g., in service provider's service area 50) can snoop and/or alter the measurement information. For instance, in case in-line services may be deployed in mobile service provider's service area 50, such a service can select downlink content based on the actual channel conditions. In various embodiments, such a content server can: (a) observe the downlink channel conditions and/or (b) select appropriately compressed material for the channel conditions being advertised. Alternatively, if an analytics tool gathers information indicating which cells may be overloaded, and which subscribers are creating the overload, such tools only need to observe the measurement reports in the IP headers and correlate this with subscriber transmissions. Note that for such tools to operate appropriately, additional base station state may be needed to correlate the IP traffic to a particular cellular site identified by its corresponding cellular identifier.

Since IP packets can be encapsulated in, for example, a GTP tunnel in the mobile packet core, diffserv markings can be preserved even when there is congestion in the RAN and the mobile packet core. In various embodiments, the IP packet can be encrypted with Secure Sockets Layer (SSL). Thus, the diffserv markings can be preserved when an IP packet is traveling outside the mobile packet core, for example, in mobile service provider's service area 50 towards the Internet 60. Accordingly, if a service in the service area terminates a session (e.g., TCP) when operating as a proxy, care should be taken to carry forward the diffserv marking on to the subsequent session. In various embodiments, if channel conditions need to be kept private inside the mobile network, any mobile service provider border function can reset the diffserv marking before a packet may be is sent to the Internet 60.

As noted, a given data plane measurement interface (e.g., data plane measurement interface 42a) can cache a measurement report received for a given mobile terminal. In various embodiments, if a new measurement report arrives before an old measurement report is encoded and transmitted, the old measurement report may be discarded and the new measurement report encoded and transmitted as opposed to the old measurement report. Once a measurement report may be encoded and transmitted, the cached copy can be cleared.

In various embodiments, uplink and downlink measurement reports can be stored separately (e.g., within in the data plane measurement interface, within a memory element in the base station, combinations thereof or the like) and can be transmitted on a first-come-first-serve basis. In various embodiments, alternate priority schemes may be equally applicable and can be configured for communication system 10. In various embodiments, channel state information can be reported on a per-mobile terminal bearer basis or on a per-mobile terminal basis. In various embodiments, a policy/profile-based mechanism can be used to determine which flows and/or which flows for which subscribers channel state information may be published. In various embodiments such a policy/profile-based mechanism may be implemented within a Gi LAN service gateway, where policy information may be known and/or distributed to one or more policy based services that may operate on subscriber data traffic.

In general, the solution provided by communication system 10, may provide a system and method for carrying channel state and base station congestion information from the RAN to the mobile packet core and service area in an IP header for traffic destined to the Internet. In various embodiments, services hosted in a service provider's service area and/or by a content server can use this information to augment service delivery and/or alter content delivery to mobile subscribes given the channel state (e.g., provide optimizations for the channel state). In various embodiments, analytics tools can use the information to gather and/or record actual channel state for mobile subscribers across the RAN.

Accordingly, the solution provided by communication system 10 for carrying channel state information and base station congestion information in IP headers using diffserv marking bits may provide for several advantages over proposed solutions for managing RAN congestion. None of the proposed 3GPP UPCON solutions provide a mechanism for reporting such information in an IP header using standardized diffserv marking bits.

Thus, the solution provided by communication system 10 does not need special interfaces to obtain channel state and base station congestion information from a RAN. Since IP packets can carry channel state and base station congestion information, the measurement infrastructure can grow with the scalability of the data plane. Additionally, the solution provided by communication system 10 may not introduce changes to existing RAN interfaces to obtain channel state information for mobile terminals and base station congestion information. Further, services hosted in a mobile service provider's service area can learn of channel state for a given mobile terminal/subscriber by simply analyzing the diffserv markings in the IP header. Moreover, analytics tools can assess the quality and state of the entire RAN by snooping all data-plane traffic communicated from the RAN. Even further, a mobile provider can hide channel state information and base station congestion information from third parties by resetting diffserv markings at their edge. Additionally, the solution provided by communication system 10 may provide that in-band data can be observed and used as evidence of, for example, data rate as opposed to OAM rate of an API.

Returning to FIG. 1, mobile terminals 12a-12b can be associated with clients or customers wishing to initiate a flow in communication system 10 via some network. The terms 'user equipment', 'mobile node', 'mobile terminal', 'end user', 'user', 'and 'subscriber' are inclusive of devices used to initiate a communication, such as a computer, a personal digital assistant (PDA), a laptop or electronic notebook, a cellular telephone, an i-Phone®, i-Pad®, a Google® Droid® phone, an IP phone, or any other device, component, element, or object capable of initiating voice, audio, video, media, or data exchanges within communication system 10. Mobile terminals 12a-12b may also be inclusive of a suitable interface to the human user such as a microphone, a display, a keyboard, or other terminal equipment. Mobile terminals 12a-12b may also be any device that seeks to initiate a communication on behalf of another entity or element such as a program, a database, or any other component, device, element, or object capable of initiating an exchange within communication system 10. Data, as used herein in this Specification, refers to any type of numeric, voice, video, media, or script data, or any type of source or object code, or any other suitable information in any appropriate format that may be communicated from one point to another.

In certain embodiments, mobile terminals 12a-12b may have a bundled subscription for network access and application services (e.g., voice, data), etc. Once the access session is established, the user can register for application services as well, without additional authentication requirements. There can be two different user data repositories (e.g., AAA databases): one for maintaining an access user profile and one for maintain an application user profile for a user. IP addresses can be assigned using dynamic host configuration protocol (DHCP), Stateless Address Auto-configuration, default bearer activation, etc., or any suitable variation thereof.

The EPC generally comprises an MME, an SGW, a PGW (which may include a Policy Charging and Charging Enforcement Function (PCEF))) and a PCRF. The EPC components may be referred to generally as control nodes, control gateways or simply gateways. The gateways may be used to provide various mobile terminal services and/or functions and to implement QoS on packet flows. The services and functions may be used, for example, to provision voice over IP (VoIP) routing, enhanced services such as enhanced charging, stateful firewalls and/or traffic performance optimization (TPO). The MME is the primary control element for the EPC. Among other things, the MME may provide for mobile terminal tracking and paging procedures including, for example, retransmissions, tracking area list management, idle mode mobile terminal tracking, etc. The MME may further provide for mobile terminal bearer procedures including activation, deactivation and modification; may provide for SGW and PGW selection for mobile terminals and may provide for authentication services. The SGW is a data plane element that can manage user mobility and interfaces with RANs. The SGW also maintains data paths between eNodeBs and NodeBs/RNCs and the PGW. The PGW provides connectivity for mobile terminals to external packet data networks, such as, for example service provider service area 50 and Internet 60. The PGW may serve as policy enforcement points to manage QoS, online/offline flow-based charging, data generation, deep-packet inspection and/or intercept.

In an embodiment, the operational functionality and services provided by SGW 16 and PGW 14 can be combined into a system architecture evolution gateway (SAE GW) (not shown), which can support combined SGW and PGW interfaces, signaling operations, functionality, services, etc. Thus, it should be understood that the embodiments, process flows, etc. discussed in the present Specification may be equally applied to communication networks that include an SAE GW.

PCRF 22 may decide policy control and/or charging activities to apply to mobile terminals based on various PCC rules. In some embodiments, PCRF 22 may communicate PCC rules to PGW 14. In various embodiments, PCRF 22 can be configured to use user subscription information as well as channel state information as a basis for policy and charging control decisions. In various embodiments, subscription information may apply for both session-based and non-session based services. For example, PCRF 22 may determine PCC rules based on an application or service described to PCRF 22 from an application function (AF). An AF or other similar function/content service may describe applications/services to PCRF 22 that may require dynamic policy and/or charging control for one or more mobile terminals. The dynamic policy and/or charging controls may include, but not be limited to, controlling the detection for service data flows, setting charging instructions for service data flows, setting QoS levels for service data flows and/or gating. As referred to herein in this Specification, PCRF 22 may be referred to generally as a policy server.

3GPP AM element 20 is a network element responsible for accounting, authorization and authentication functions for mobile terminals 12a-12b. For the AAA considerations, AAA element 20 may provide a mobile node IP address and the accounting session identification (Acct-Session-ID) and other mobile node states in appropriate messaging (e.g., via an access-Request/access Accept message). An accounting message can be sent for the following events: accounting-start when the IP session is initially created for the mobile node on the gateway; accounting-interim-update when a handover occurred between gateways; and an accounting-stop when the IP session is removed from the gateway serving the element. For roaming scenarios, the home routed case is fully supported by the architecture.

HSS 18 can offer a subscriber database in 3GPP (e.g., GSM, LTE, etc.) environments. In one sense, HSS 18 can provide functions similar to those offered by an AAA element server in a CDMA environment. When a mobile terminal moves to 3GPP access, HSS 18 can be aware of this location and the user's PDN anchor point (e.g., PGW 14). Additionally, HSS 18 can communicate with AAA element 20 such that when a mobile moves to a CDMA environment, it still has an effective anchor (e.g., PGW 14) for communications. Thus, HSS 18, AM element 20 and PCRF 22 can coordinate state information for mobile terminals (and synchronize this information) to achieve mobility within the system.

RNC 36 generally operates as a management component for a radio interface. This management may be done through remote commands to a corresponding NodeB within communication system 10. RNC 36 can control any number of NodeBs 38. In addition to providing for the distribution of radio channel and base station congestion state information via data plane measurement interface 42b, some other responsibilities of RNCs may include management of radio channels, providing measurement report commands and assisting in handoff/handover scenarios. In various embodiments, RNC 36 can alternatively provide for outer loop power control, load control, admission control, packet scheduling, security functions, etc.

The communications interface provided by the RAN of NodeB 38 may allow data to be exchanged between an end user and any number of selected elements within communication system 10. For example, NodeB 38 may facilitate the delivery of a request packet generated by mobile terminal 12b and the reception of information sought by an end user. NodeB 38 is only one example of a communications interface between an end user and NodeB 38. Other suitable types of communications interfaces may be used for any appropriate network design and, further, may be based on specific communications architectures in accordance with particular needs. In various embodiments, NodeB 38 can be a communicative interface, which may comprise radio transmission/reception devices, components, or objects, and antennas. In various embodiments, NodeB 38 may be coupled to RNC 36 (via one or more intermediate elements) using a landline (such as a T1/E1 line, for example) interface. In various embodiments, NodeB 38 may operate as a series of complex radio modems where appropriate. In various embodiments, NodeB 38 may also perform transcoding and rate adaptation functions in accordance with particular needs.

Figure 2:
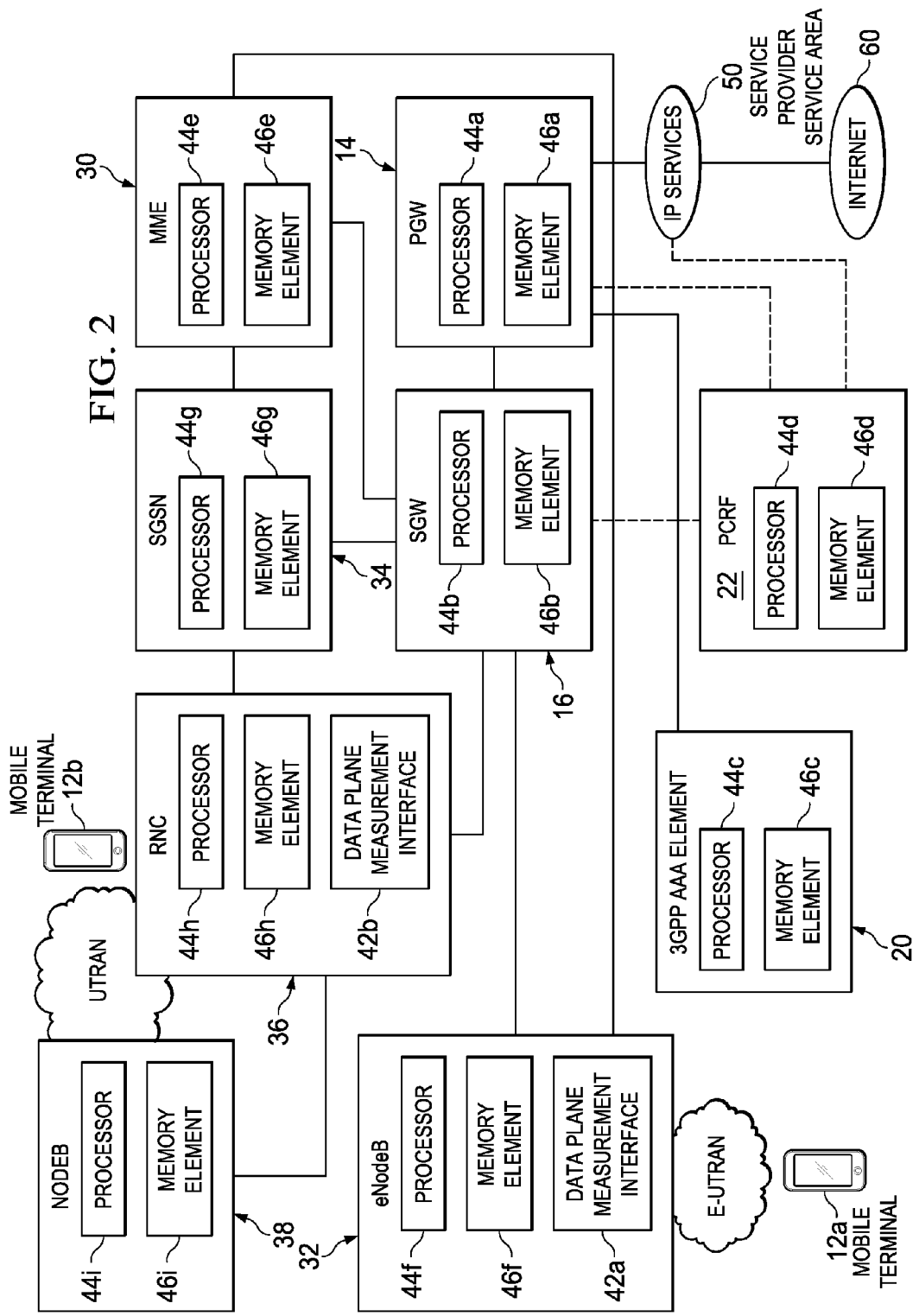
FIG. 2 is a simplified block diagram illustrating details associated with one potential embodiment of the communication system.

Turning to FIG. 2, FIG. 2 is a simplified block diagram illustrating additional details associated with one potential embodiment of communication system 10. FIG. 2 includes PGW 14, SGW 16, AAA element 20, PCRF 22 MME 30, eNodeB 32, SGSN 34, RNC 36 and NodeB 38 of communication system 10. Each of these elements may include a respective processor 44a-44i and a respective memory element 46a-46i. As shown in FIG. 2, eNodeB may include data plane measurement interface 42a and RNC 36 may include data plane measurement interface 42b. Hence, appropriate software and/or hardware is being provisioned in PGW 14, SGW 16, AAA element 20, PCRF 22 MME 30, eNodeB 32, SGSN 34, RNC 36 and NodeB 38 in order to facilitate providing distribution of radio channel state and base station congestion state in a network environment for communication system 10. Note that in certain examples, certain databases (e.g., for storing uplink and/or downlink channel state) can be consolidated with memory elements (or vice versa), or the storage can overlap/exist in any other suitable manner. Service provider service area 50 including IP services, Internet 60 and mobile terminals 12a-12b are also shown in FIG. 2.

In one example implementation, PGW 14, SGW 16, AAA element 20, PCRF 22 MME 30, eNodeB 32, SGSN 34, RNC 36 and NodeB 38 are network elements, which are meant to encompass network appliances, servers, routers, switches, gateways, bridges, loadbalancers, firewalls, processors, modules, or any other suitable device, component, element, or object operable to exchange information that facilitates or otherwise helps to provide for distributing channel state information and base station congestion information (e.g., for communication system 10 as illustrated in FIG. 2). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information.

In regards to the internal structure associated with communication system 10, each of PGW 14, SGW 16, AAA element 20, PCRF 22 MME 30, eNodeB 32, SGSN 34, RNC 36 and NodeB 38 can include respective memory elements [as shown in FIG. 2] for storing information to be used in achieving the radio channel state and base station congestion state distribution techniques, as outlined herein. Additionally, each of these devices may include a processor that can execute software or an algorithm to perform the radio channel state and base station congestion state distribution activities as discussed in this Specification. These devices may further keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term "memory element." The information being tracked or sent to PGW 14, SGW 16, AAA element 20, PCRF 22 MME 30, eNodeB 32, SGSN 34, RNC 36 and NodeB 38 could be provided in any database, register, control list, cache, or storage structure: all of which can be referenced at any suitable timeframe. Any such storage options may be included within the broad term "memory element" as used herein. Similarly, any of the potential processing elements, modules, and machines described herein should be construed as being encompassed within the broad term "processor." Each of the network elements and user equipment (e.g., mobile nodes) can also include suitable interfaces for receiving, transmitting, and/or otherwise communicating data or information in a network environment.

Note that in certain example implementations, the radio channel state and base station congestion state distribution techniques as outlined herein may be implemented by logic encoded in one or more tangible media, which may be inclusive of non-transitory media (e.g., embedded logic provided in an ASIC, in DSP instructions, software [potentially inclusive of object code and source code] to be executed by a processor, or other similar machine, etc.). In some of these instances, memory elements [as shown in FIG. 2] can store data or information used for the operations described herein. This includes the memory elements being able to store software, logic, code, or processor instructions that are executed to carry out the activities described herein.

A processor can execute any type of instructions associated with the data or information to achieve the operations detailed herein. In one example, the processors [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, EEPROM) or an ASIC that includes digital logic, software, code, electronic instructions, or any suitable combination thereof.

Figure 3:
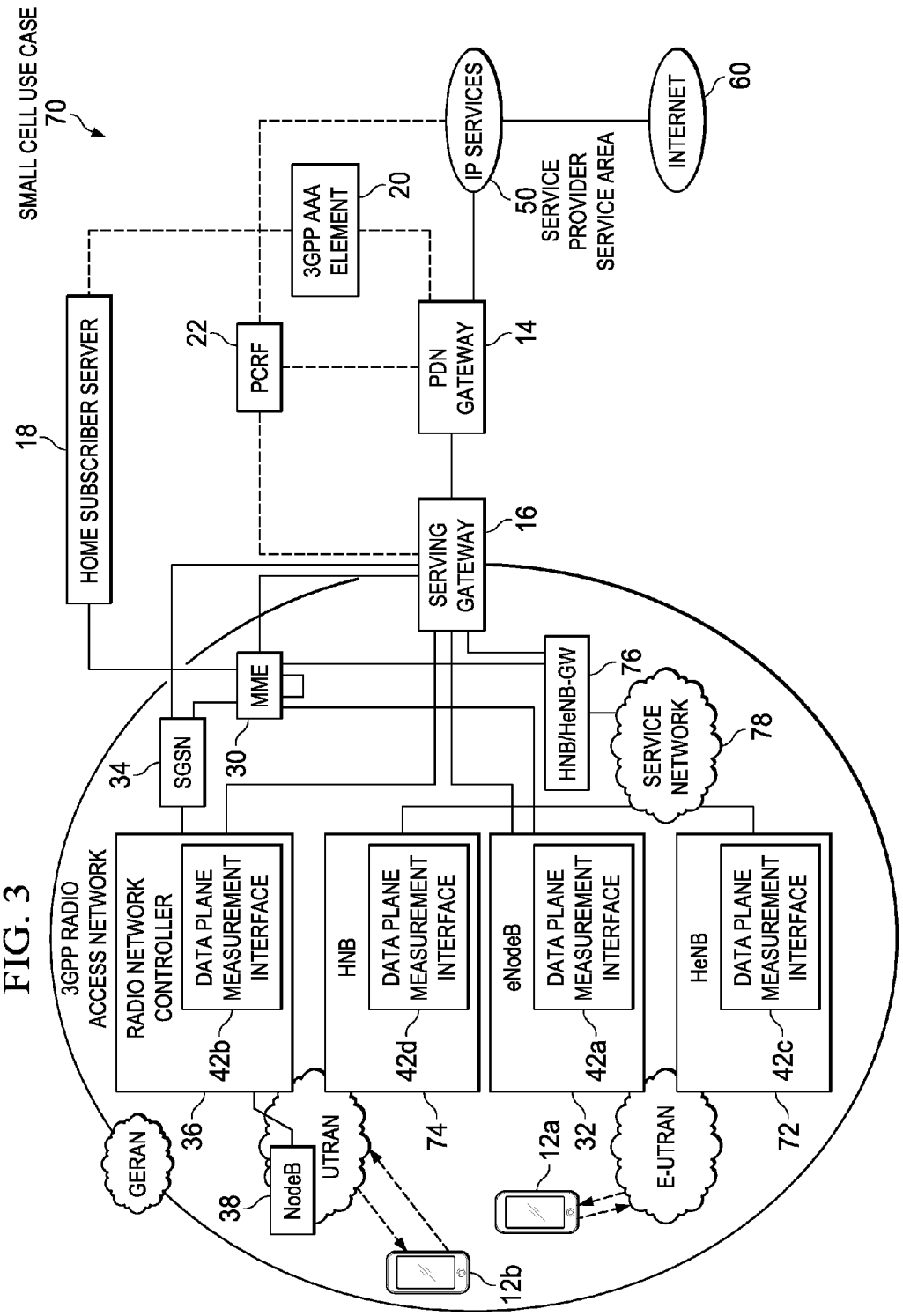
FIG. 3 is a simplified block diagram illustrating details associated with a small cell use case associated with one potential embodiment of the communication system.

Turning to FIG. 3, FIG. 3 is a simplified block diagram illustrating a small cell use case 70 in accordance with one embodiment of communication system 10. FIG. 3 includes mobile terminals 12a-12b, PGW 14, SGW 16, HSS 18, AAA element 20, PCRF 22, MME 30, eNodeB 32, SGSN 34, RNC 36, NodeB 38, service provider service area 50 and internet 60. As noted above, the 3GPP RAN may include a small cell architecture, which can improve reception in areas with poor coverage, or within buildings where coverage may be reduced by the structure itself. Thus, FIG. 3 additionally includes a HeNB 72 and an HNB 74, each of which may interface with an HNB/HeNB-GW 76 via a service network 78 to provide small cell access network coverage for communication system 10. HeNBs (e.g., HeNB 72) may provide cellular coverage for 4G/LTE/LTE-A small cell architectures while HNBs (e.g., HNB 74) may provide cellular coverage for 3G small cell architectures. Note service network 78 may be included in or part of service provider service area and/or internet 60. HNB/HeNB-GW 76 may interface with MME 30 and SGW 16. The interface with SGW 16 is typically provided via a Security gateway (SeGW), which is not shown in FIG. 3 for purposes of brevity.

HeNB 72 may include a data plane measurement interface 42c and HNB 74 may include a data plane measurement interface 42d. HeNB 72, HNB 74 and HNB/HeNB-GW 76 may each include a respective processor (not shown) and a respective memory element (not shown); hence, appropriate software and/or hardware can be provisioned in HeNB 72 and HNB 74 in order to facilitate providing distribution of radio channel state and base station congestion state in a network environment. Accordingly, the functionality provided by HeNB 72 may be similar to that as described for eNodeB 32 and the functionality provided by HNB 74 may be similar to that as described for RNC 36 and NodeB 38. Thus, as shown in FIG. 3, the solutions provided by communication system 10 may be extended to include small cell RAN architectures.

Figure 4:
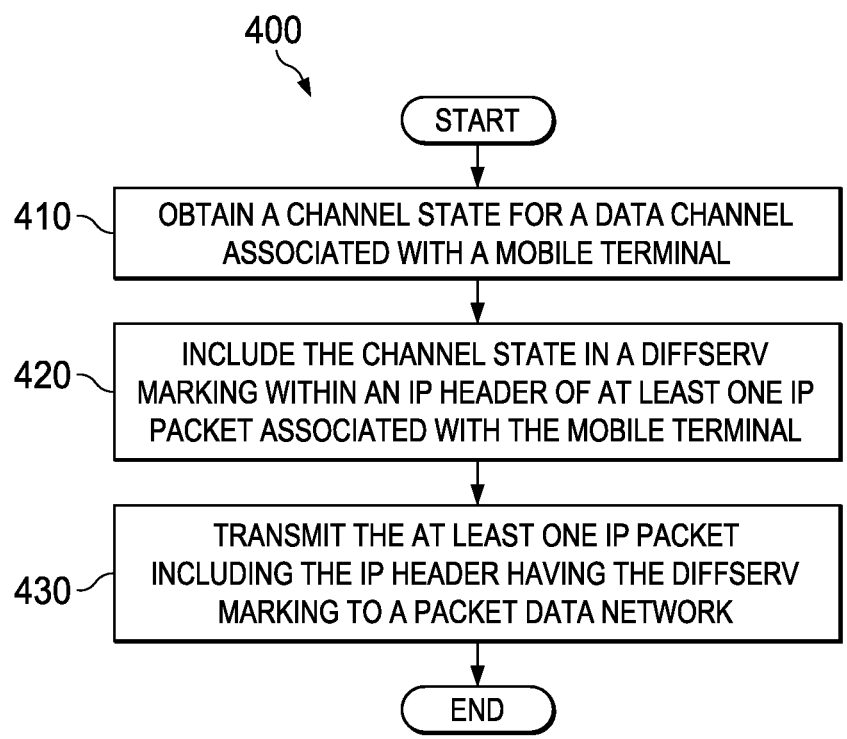
FIG. 4 is a simplified flow diagram illustrating example operations associated with one embodiment of the communication system.

Turning to FIG. 4, FIG. 4 is a simplified flow diagram 400 illustrating example operations associated with an embodiment of communication system 10. In one example embodiment, these operations may be carried out by eNodeB 32, including data plane measurement interface 42a, RNC 36, including data plane measurement interface 42b (as shown in FIG. 1), HeNB 72, including data plane measurement interface 42c and/or HNB 74, including data plane measurement interface 42d (as shown in FIG. 3). Processing may begin at 410 when a channel state for a data channel associated with a particular mobile terminal (e.g., mobile terminal 12a) may be received by data plane measurement interface 42a. Although the operations for FIG. 4 are discussed in reference to data plane measurement interface 42a, it should be understood that these operations may be equally applicable to data plane measurement interfaces 42b-42d. In one or more embodiments, obtaining the channel state may include receiving a measurement report for the corresponding data channel. The measurement report can be associated with an uplink data channel or a downlink data channel for the mobile terminal.

At 420, data plane measurement interface 42a may include the channel state in a diffserv marking within an IP header of at least one IP packet associated with the mobile terminal. In various embodiments, the channel state may be set in one or more bits of the diffserv marking in the IP header. In various embodiments, data plane measurement interface 42a may set one or more bits in the diffserv marking of the IP header to indicate that the IP header includes the channel state (e.g., a setting of '01' or '10'). In still another embodiment, data plane measurement interface 42a may set one or more bits in the diffserv marking of the IP header to indicate that the IP header includes the channel state and that a base station serving the mobile terminal is experiencing congestion (e.g., a setting of '11'). In yet another embodiment, data plane measurement interface 42a may set one or more bits in the diffserv marking to indicate whether the channel state is associated with an uplink data channel or a downlink data channel.

At 430, data plane measurement interface 42a may transmit the at least one IP packet including the IP header having the diffserv marking toward a packet data network. In various embodiments, the packet data network can include, but not be limited to, a service provider service area and/or an Internet. In various embodiments, the service provider service area can include one or more IP services, one or more content services, and/or one or more analytics tools.

Figure 5B:
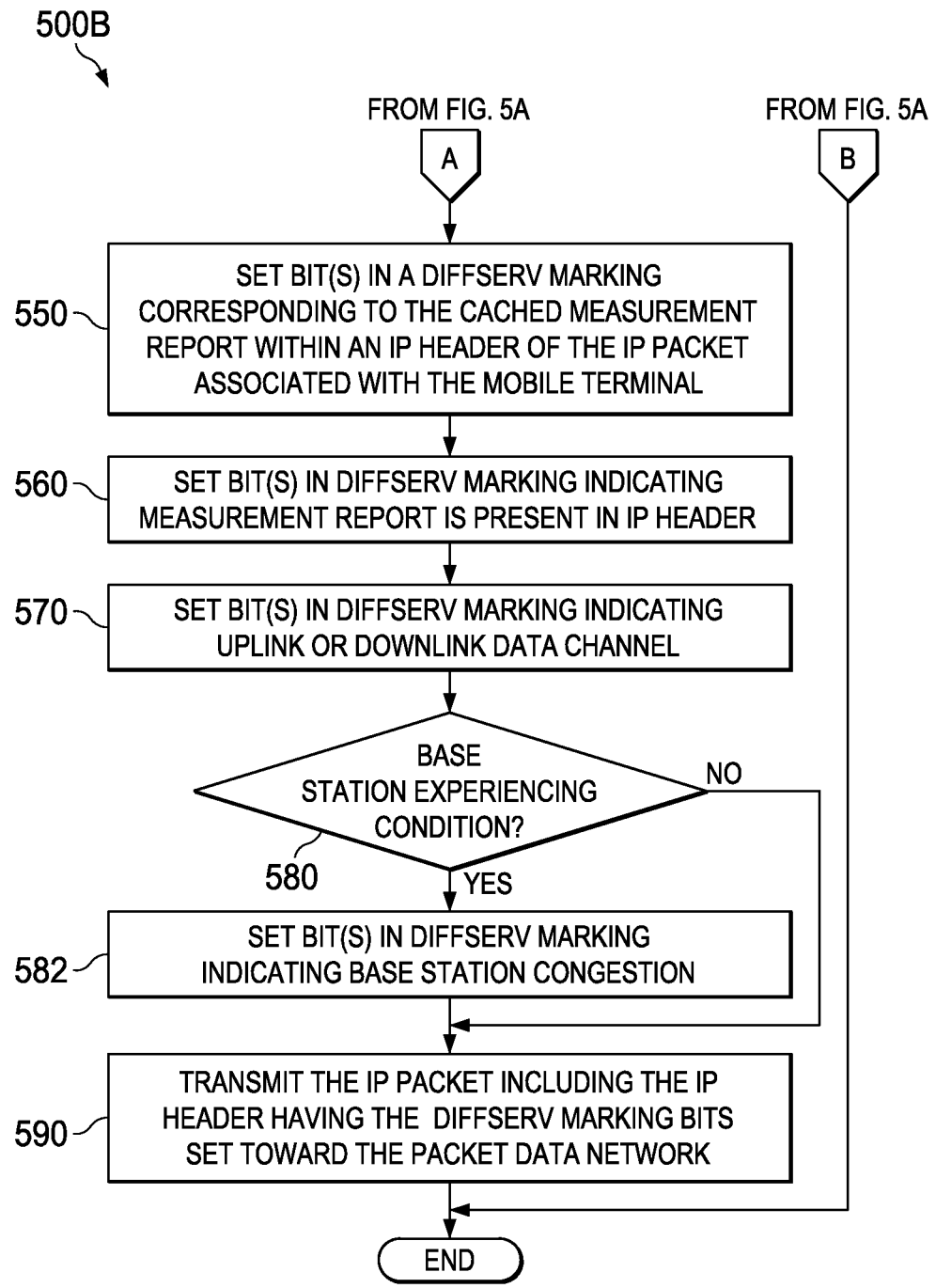

Turning to FIGS. 5A-5B, FIGS. 5A-5B simplified flow diagrams 500A-500B illustrating example operations associated with the distribution of radio channel state and base station congestion state according to an embodiment of communication system 10. In one example embodiment, these operations may be carried out by eNodeB 32, including data plane measurement interface 42a, RNC 36, including data plane measurement interface 42b (as shown in FIG. 1), HeNB 72, including data plane measurement interface 42c and/or HNB 74, including data plane measurement interface 42d (as shown in FIG. 3).

Processing may begin, as shown in FIG. 5A, at 510 when data plane measurement interface 42a may determine whether an IP packet associated with a particular mobile terminal (e.g., mobile terminal 12a) is ready for transmission toward a packet data network. Although the operations for FIGS. 5A-5B are discussed in reference to data plane measurement interface 42a, it should be understood that these operations may be equally applicable to data plane measurement interfaces 42b-42d. If an IP packet is not ready, the processing may complete (e.g., continue to FIG. 5B). If an IP packet is ready for transmission, data plane measurement interface 42a may determine at 520 whether a channel measurement report is cached for a data channel associated with the mobile terminal. If a channel measurement report is not cached, the processing may complete (e.g., continue to FIG. 5B). In various embodiments, measurement reports can be cached in one or more memory elements, one or more databases, combinations thereof or the like, which may be accessible by data plane measurement interface 42a and/or eNodeB 32.

If a channel measurement report is cached, data plane measurement interface 42a may determine at 530 whether a new measurement report has been received for the data channel. If a new measurement report has not been received for the data channel, data plane measurement interface 42a may, continuing to FIG. 5B, set one or more bits in a diffserv marking corresponding to the cached measurement report within an IP header of the IP packet associated with the mobile terminal at 550.

If a new measurement report has been received, data plane measurement interface may discard the cached measurement report at 540 and may cache the new measurement report at 542. Processing may continue to FIG. 5B at 550, as discussed above, and one or more bits may be set in the diffserv marking corresponding to the cached measurement report (e.g., the cached measurement report now representing the newly received measurement repot).

Continuing from 550 in FIG. 5B, data plane measurement interface 42a may set one or more bits in the diffserv marking indicating that the measurement report is present in the IP header at 560. At 570, data plane measurement interface 42a may set one or more bits in the diffserv marking indicating whether the measurement report corresponds to an uplink or downlink data channel for the mobile terminal. At 580, data plane measurement interface 42a may determine if eNodeB 32 (e.g., the base station serving the mobile terminal) is experiencing congestion. If eNodeB 32 is not experiencing congestion, processing may continue to 590 where data plane measurement interface 42a may transmit the IP packet including the IP header having the diffserv marking bits set toward the packet data network. If eNodeB 32 is experiencing congestion, data plane measurement interface 42a may set one or more bits in the diffserv marking indicating that eNodeB 32 is experiencing congestion at 582 and may continue to 590 where data plane measurement interface 42a may transmit the IP packet including the IP header having the diffserv marking bits set toward the packet data network.

Figure 6A:
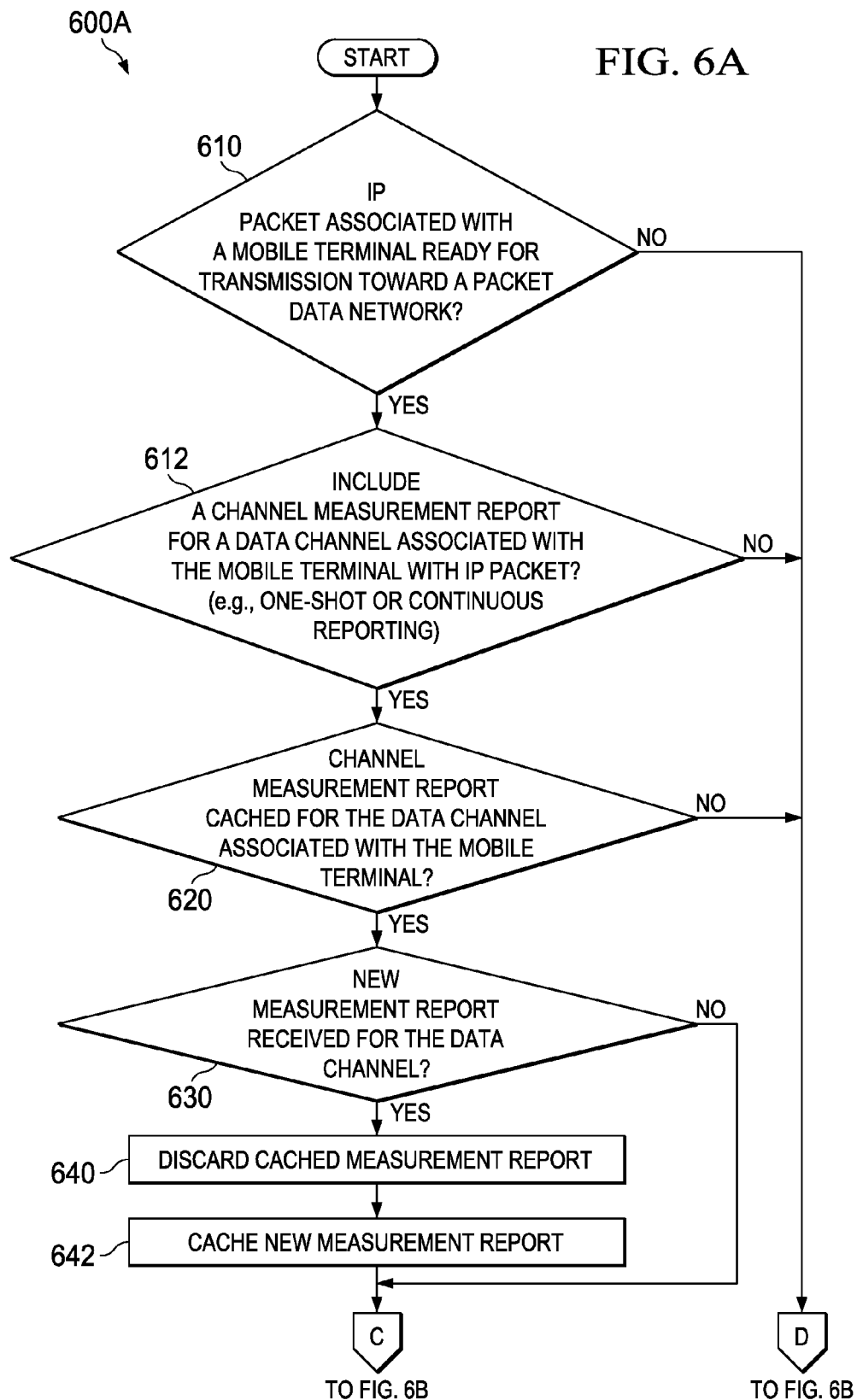
FIGS. 6A-6B are simplified flow diagrams illustrating other example operations associated with the distribution of radio channel state and base station congestion state in one embodiment of the communication system.
Figure 6B:
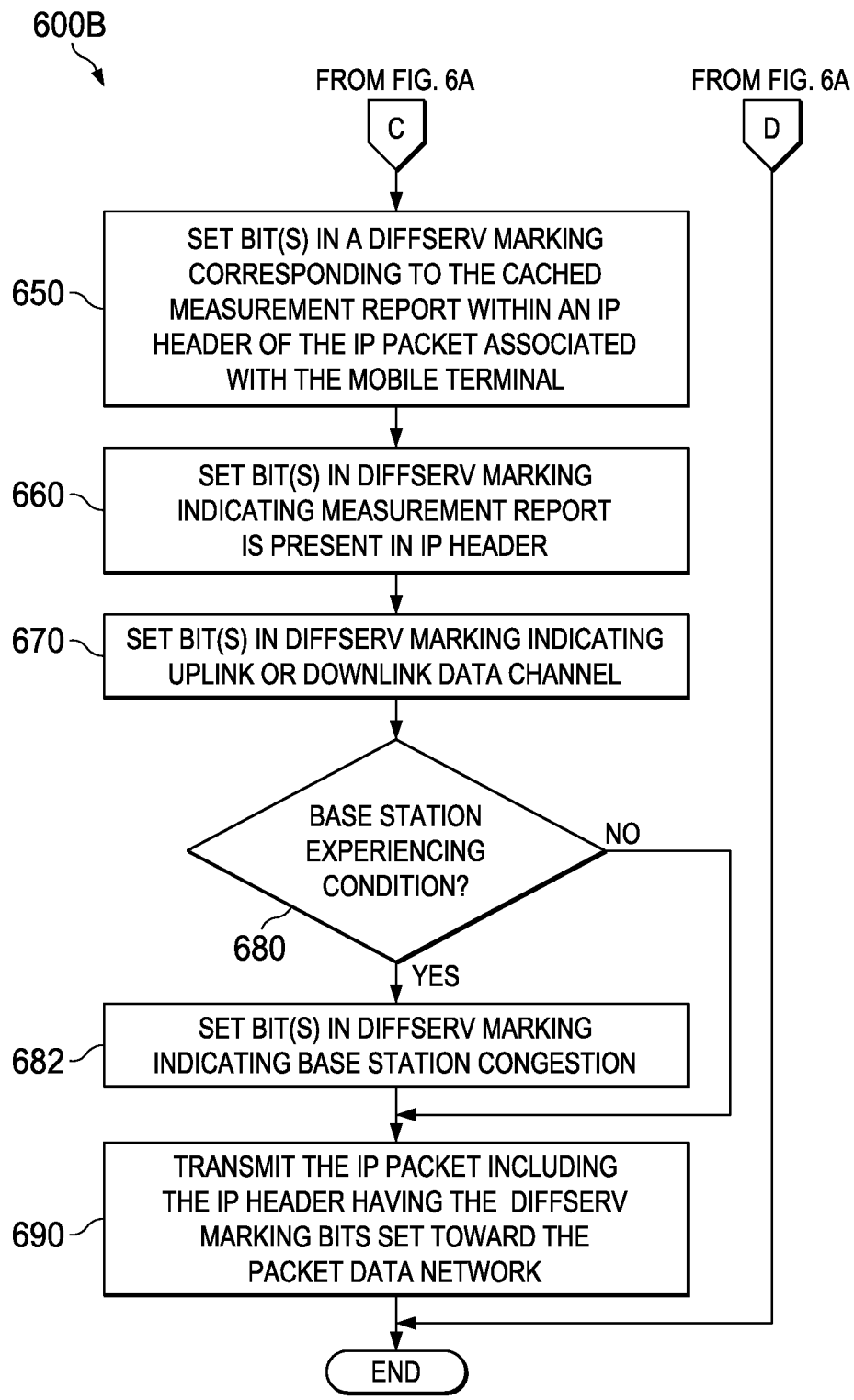

Turning to FIGS. 6A-6B, FIGS. 6A-6B are simplified flow diagrams 600A-600B illustrating other example operations associated with the distribution of radio channel state and base station congestion state according to an embodiment of communication system 10. In one example embodiment, these operations may be carried out by eNodeB 32, including data plane measurement interface 42a, RNC 36, including data plane measurement interface 42b (as shown in FIG. 1), HeNB 72, including data plane measurement interface 42c and/or HNB 74, including data plane measurement interface 42d (as shown in FIG. 3). The operations illustrated in FIGS. 6A-6B may be largely similar to the operations described for FIGS. 5A-5B. At 610, data plane measurement interface 42a may determine whether an IP packet associated with a particular mobile terminal (e.g., mobile terminal 12a) is ready for transmission toward a packet data network. Similar to the operations described above, it should be understood that the operations described in FIGS. 6A-6B can be equally performed by data plane measurement interface 42a and data plane measurement interfaces 42b-42d.

An additional step, step 612, is illustrated in FIG. 6A, which is not illustrated in FIG. 5A. At 612, data plane measurement interface 42a may determine whether a channel measurement report for a data channel associated the mobile terminal should be included with the IP packet. As discussed above, channel state (e.g., a measurement report) for a mobile terminal can be conditionally included in diffserv markings for IP packets associated with the mobile terminal either as a 'one-shot' indication of channel state (e.g., included in the header of a single IP packet for the mobile terminal or a particular bearer of the mobile terminal) or as continuous indication of channel state (e.g., included in the header of more than one IP packet for the mobile terminal or a particular bearer of the mobile terminal).

If a channel measurement report is not to be included in the header of the IP packet, processing may complete (continue to FIG. 6B). However, if a channel measurement report is to be included in the header of the IP packet, processing may continue to 620. For the remainder of the processing, steps 620, 630, 640, 642, 650, 660, 670, 680, 682 and 690 may operate in a similar manner as described for steps 520, 530, 540, 542, 550, 560, 570, 580, 582 and 590 of FIGS. 5A-5B.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   obtaining, within a radio access network, a channel state for a data channel associated with a mobile terminal, wherein the data channel is at least one of an uplink or a downlink radio channel between the mobile terminal and a cellular base station in communication with the mobile terminal and wherein the channel state is associated, at least in part, with radio conditions of the data channel;
   including the channel state in a differentiated services (diffserv) marking within an Internet Protocol (IP) header of at least one IP packet associated with the mobile terminal, wherein the diffserv marking includes one or more bits indicating:
   (i) the presence of the channel state for the data channel associated with the mobile terminal in the IP header,
   (ii) whether the channel state is for an uplink data channel or downlink data channel associated with the mobile terminal, and
   (iii) at least one of: a radio interface measurement for the data channel associated with the mobile terminal and an indication that the cellular base station serving the mobile terminal is experiencing resource congestion; and
   transmitting the at least one IP packet that includes the IP header having the diffserv marking to one or more IP services of a service provider service area that is outside a mobile packet core, wherein the one or more IP services interface with a packet data network gateway that is within the mobile packet core and interface with an internet that is outside the mobile packet core.

2. The method of claim 1, wherein obtaining the channel state includes receiving, by a data plane measurement interface, a first measurement report indicating the channel state of the data channel associated with the mobile terminal and wherein including the channel state in the diffserv marking includes, at least in part, setting one or more bits corresponding to the first measurement report in the diffserv marking.

3. The method of claim 2, wherein the data plane measurement interface is contained within a radio network controller in the radio access network.

4. The method of claim 2, wherein the data plane measurement interface is contained within an eNodeB in the radio access network.

5. The method of claim 2, wherein the data plane measurement interface is contained within at least one of:
a Home Node B (HNB) in the radio access network; and
a Home eNode B (HeNB) in the radio access network.

6. The method of claim 2, further comprising:
caching the first measurement report in at least one memory element;
determining whether a subsequent measurement report associated with the mobile terminal has been received;
discarding the first measurement report if a subsequent measure has been received; and
caching the subsequent measurement report in the at least one memory element.

7. The method of claim 6, wherein the subsequent measurement report can include at least one of:
an updated channel state for the data channel as represented by the first measurement report associated with the mobile terminal; and
a new channel state for another data channel associated with the mobile terminal.

8. The method of claim 1, wherein the diffserv marking includes one or more bits indicating that the cellular base station serving the mobile terminal is experiencing resource congestion.

9. One or more non-transitory tangible media encoding logic that include instructions for execution by a processor, wherein the execution causes the processor to perform operations, comprising:
obtaining, within a radio access network, a channel state for a data channel associated with a mobile terminal, wherein the data channel is at least one of an uplink or a downlink radio channel between the mobile terminal and a cellular base station in communication with the mobile terminal and wherein the channel state is associated, at least in part, with radio conditions of the data channel;
including the channel state in a differentiated services (diffserv) marking within an Internet Protocol (IP) header of at least one IP packet associated with the mobile terminal, wherein the diffserv marking includes one or more bits indicating:
(i) the presence of the channel state for the data channel associated with the mobile terminal in the IP header,
(ii) whether the channel state is for an uplink data channel or downlink data channel associated with the mobile terminal, and
(iii) at least one of: a radio interface measurement for the data channel associated with the mobile terminal and an indication that the cellular base station serving the mobile terminal is experiencing resource congestion; and
transmitting the at least one IP packet that includes the IP header having the diffserv marking to one or more IP services of a service provider service area that is outside a mobile packet core, wherein the one or more IP services interface with a packet data network gateway that is within the mobile packet core and interface with an internet that is outside the mobile packet core.

10. The media of claim 9, wherein obtaining the channel state includes receiving, by a data plane measurement interface, a first measurement report indicating the channel state of the data channel associated with the mobile terminal and wherein including the channel state in the diffserv marking includes, at least in part, setting one or more bits corresponding to the first measurement report in the diffserv marking.

11. The media of claim 10, the operations further comprising:
caching the first measurement report in at least one memory element;
determining whether a subsequent measurement report associated with the mobile terminal has been received;
discarding the first measurement report if a subsequent measure has been received; and
caching the subsequent measurement report in the at least one memory element.

12. The media of claim 11, wherein the subsequent measurement report can include at least one of:
a new channel state for the data channel as represented by the first measurement report associated with the mobile terminal; and
a new channel state for another data channel associated with the mobile terminal.

13. The media of claim 9, wherein the diffserv marking includes one or more bits indicating that the cellular base station serving the mobile terminal is experiencing resource congestion.

14. An apparatus, comprising:
a data plane measurement interface;
at least one memory element for storing data; and
at least one processor that executes instructions associated with the data, wherein the at least one processor and the at least one memory element cooperate such that the apparatus is configured for:
obtaining, within a radio access network, a channel state for a data channel associated with a mobile terminal, wherein the data channel is at least one of an uplink or a downlink radio channel between the mobile terminal and a cellular base station in communication with the mobile terminal and wherein the channel state is associated, at least in part, with radio conditions of the data channel;
including the channel state in a differentiated services (diffserv) marking within an Internet Protocol (IP) header of at least one IP packet associated with the mobile terminal, wherein the diffserv marking includes one or more bits indicating:
(i) the presence of the channel state for the data channel associated with the mobile terminal in the IP header,
(ii) whether the channel state is for an uplink data channel or downlink data channel associated with the mobile terminal, and
(iii) at least one of: a radio interface measurement for the data channel associated with the mobile terminal and an indication that the cellular base station serving the mobile terminal is experiencing resource congestion; and
transmitting the at least one IP packet that includes the IP header having the diffserv marking to one or more IP services of a service provider service area that is outside a mobile packet core, wherein the one or more IP services interface with a packet data network gateway that is within the mobile packet core and interface with an internet that is outside the mobile packet core.

15. The apparatus of claim 14, wherein the data plane measurement interface is contained within at least one of:

a radio network controller in the radio access network; and an eNodeB in the radio access network.

16. The apparatus of claim 14, wherein the data plane measurement interface is contained within at least one of:

a Home Node B (HNB) in the radio access network; and a Home eNode B (HeNB) in the radio access network.

17. The apparatus of claim 14, wherein obtaining the channel state includes receiving, by the data plane measurement interface, a first measurement report indicating the channel state of the data channel associated with the mobile terminal and wherein including the channel state in the diffserv marking includes, at least in part, setting one or more bits corresponding to the first measurement report in the diffserv marking.

18. The apparatus of claim 17, wherein the apparatus is further configured for:

caching the first measurement report in the at least one memory element;

determining whether a subsequent measurement report associated with the mobile terminal has been received;

discarding the first measurement report if a subsequent measure has been received; and caching the subsequent measurement report in the at least one memory element.

19. The apparatus of claim 18, wherein the subsequent measurement report can include at least one of:

a new channel state for the data channel as represented by the first measurement report associated with the mobile terminal; and a new channel state for another data channel associated with the mobile terminal.

20. The apparatus of claim 14, wherein the diffserv marking includes one or more bits indicating that the cellular base station serving the mobile terminal is experiencing resource congestion.

* * * * *

UNITED STATES PATENT AND TRADEMARK OFFICE
CERTIFICATE OF CORRECTION

PATENT NO. : 10,015,289 B2
APPLICATION NO. : 14/457995
DATED : July 3, 2018
INVENTOR(S) : Hendrikus G. P. Bosch et al.

It is certified that error appears in the above-identified patent and that said Letters Patent is hereby corrected as shown below:

In the Specification

In Column 3, Line 43, delete "(LIE))" and insert -- (UE)) --, therefor.

In Column 4, Line 30, delete "51" and insert -- S1 --, therefor.

In Column 12, Line 16, delete "AM" and insert -- AAA --, therefor.

In Column 12, Line 39, delete "AM" and insert -- AAA --, therefor.

Signed and Sealed this
Eighteenth Day of June, 2019

Andrei Iancu
*Director of the United States Patent and Trademark Office*